United States Patent [19]

Takahashi

[11] Patent Number: 4,643,348

[45] Date of Patent: Feb. 17, 1987

[54] BRAZING METHOD FOR ALUMINUM PARTS

[75] Inventor: Susumu Takahashi, Yokohama, Japan

[73] Assignee: Kanto Yakin Kogyo Kabushiki Kaisha, Hirat Suka, Japan

[21] Appl. No.: 795,509

[22] Filed: Nov. 6, 1985

[51] Int. Cl.$^4$ .............................................. B23K 1/20
[52] U.S. Cl. ............................... 228/223; 228/263.17; 148/26
[58] Field of Search .................. 228/263.17, 223, 224; 148/26, 23

[56] References Cited

U.S. PATENT DOCUMENTS

| | | | |
|---|---|---|---|
| 2,809,423 | 10/1957 | Hanink | 148/26 X |
| 3,305,407 | 2/1967 | Koeplinger | 228/263.17 X |
| 4,224,086 | 9/1980 | Stokes, Jr. et al. | 228/223 X |
| 4,556,165 | 12/1985 | Yamawaki et al. | 228/263.17 X |

OTHER PUBLICATIONS

Metals Handbook, 8th Edition, vol. 6, pp. 676–680, by American Society for Metals, "Brazing of Aluminum Alloys".

*Primary Examiner*—Nicholas P. Godici
*Assistant Examiner*—Carmine Cuda
*Attorney, Agent, or Firm*—Shlesinger, Fitzsimmons, Shlesinger

[57] ABSTRACT

Method of brazing aluminum or aluminum alloy parts, using a flux which is made from an eutectic of $BaCl_2$, NaCl, and KCl as a base, and one or more of fluorides as an activating agent. On account of the flux being not deliquescent, the brazing method can be carried in an atmosphere which is free from oxygen. Flux residues are easily removable in this invention.

4 Claims, No Drawings

BRAZING METHOD FOR ALUMINUM PARTS

BACKGROUND OF THE INVENTION

This invention relates to a brazing method for joining component parts of aluminium or alloys thereof.

A flux employed today for joining the aluminium parts with a brazing metal could be classified into two groups, viz., one which is soluble in water and another which is insoluble in water. The water-soluble flux is generally made from a mixture of chlorides such as chloride of alkali metal or alkaline earth metal, while the water-insoluble flux is represented by fluorides such as fluoroamine-potassium-complex. Almost all of the water-soluble fluxes which are made from chlorides are deliquescent, and when they become moist, they have severe corrosive actions against aluminium materials and brazing apparatus. On the other hand, residues of fluxes containing fluorides which have adhered to surfaces of aluminium parts after brazing, can hardly be removed by washing.

For example, a conventional water-solute flux which is made from a mixture of chlorides such as NaCl, KCl, LiCl, $ZnCl_2$, $CaCl_2$, and fluorides is extremely deliquescent. When said flux is applied to a brazing sheet, and heated in a furnace, it is decomposed and evaporates as shown in the following formula, whereby its efficiency as flux considerably lowers.

$$ZnCl_2 + H_2O \rightarrow ZnO + HCl$$

Meanwhile, the flux which has evaporated, adheres to the furnace and its fixtures and jigs, adsorbs moisture, and corrodes them. This means that a brazing operation with the employment of a deliquescent flux makes it meaningless to carry it under an atmosphere of a low oxygen and low dew point such as of an oxygen content lower than 50 ppm and a dew point lower than $-50°$ C., since the flux itself is hydroscopic. Therefore, the operation is generally conducted in an atmospheric condition. Since this condition is not reliable to prevent the oxidation of component parts of aluminium or alloys thereof, an excessive amount of flux has to be used for the brazing operation in order to remove metal oxides produced during the operation. Further, residues of flux which have adhered to the components have to be throughly washed out, since they are corrosive against the components in the presence of moisture.

The aforementioned water-insoluble fluxes have been developed so that it is not necessary they be removed after brazing. They are mixtures of $KAlF_4$ and $K_3AlF_6$ which are insoluble in water even after brazing, and are not corrosive even in the presence of moisture. However, this kind of flux has the drawback that its residues adhere firmly onto aluminium components after brazing, and they can hardly be removed. Especially when the components are to be subjected to a surface treatment after having been brazed, the residues become barriers to the treatment. And, when brazed aluminium components are employed in processing food, it is impossible to prevent scattering of flux residues into the food, though this should be completely avoided.

BRIEF SUMMARY OF THE INVENTION

This invention is, therefore, to provide a brazing method for joining component parts of aluminium or alloys thereof, which is characterized in that a flux which has been left on the parts after brazing can readily be removed by washing and so on, that the flux and its residues are not deliquescent, and that the brazing operation can be conducted under an atmosphere of a low oxygen condition and of a low dew point, effectively preventing the oxidation of component parts.

More in practice, the method in accordance with this invention employs as a flux, a eutectic mixture of $BaCl_2$, NaCl, and KCl, which is not deliquescent and which is activated by the addition of fluorides thereto. And, this invention also relates to a method of applying said specific flux in conjunction with a specific atmosphere.

The eutectic point of $BaCl_2$ of 54.7%, NaCl of 18.0%, and KCl of 27.3% is 540° C., which temperature seems appropriate for brazing aluminium or aluminium alloy component parts, the brazing temperature of which is generally within 580°–615° C. and, in connection with aluminium hard solders employed are generally of an Al-Si system having a melting point of 561°–580° C. Although the above-mentioned eutectic mixture or alloy is therefore good as a flux as it is, fluorides are added thereto in order to make it chemically more active. Even when fluorides are added at a rate of 1–20 weight %, the rise in the melting point of the mixture is only about 20° C. That is, a melting point of the eutectic mixture or alloy is limited to 560° C. which is still appropriate for the intended brazing in accordance with this invention. This means that a mixing ratio of constituents of said mixture could be varied, taking into consideration a rise in its melting temperature by the addition of fluorides, viz., about 10°–15° C. The mixing ratio is 55–47 weight % for $BaCl_2$, 18–22% for NaCl, and 27–33% for KCl.

It shall be noted that a mixture or eutectic alloy of $BaCl_2$, NaCl, and KCl is not deliquescent, and that a flux made from said mixture with the addition of fluorides is also not deliquescent.

In practice, a flux in accordance with this invention is made of fine powders of less than $50\mu$. The powders are prepared as a suspension of a desired density by the addition of a solvent, and then applied to aliminium parts to be brazed. The solvent shall be one without a water content when a water-soluble fluoride is used, since such fluoride reacts with a eutectic mixture of $BaCl_2$, NaCl, and KCl, and changes the composition of the mixture. When the fluoride is water-insoluble the solvent may contain water or may be water.

In view of the fact that aluminium or alloys thereof easily form chemically strong oxidized surface films on account of oxygen or steam even under a comparatively low temperature, and that such films lower brazing efficiencies, the method in accordance with this invention, which can be carried under an atmosphere of little oxygen and a low dew point, is very advantageous.

It is also very advantageous in this invention that a flux of a minimum amount is required.

EXAMPLES

Example 1

A eutectic base of $BaCl_2$, NaCl, and KCl at mixing ratios by weight of 54.7, 18.0, 23.3% was ground to obtain its powder of less than $50\mu$. To this powder, there was added 10 weight % of $ZnF_2$ to obtain a flux. This flux was made to a suspension by adding thereto a solvent which does not contain water, viz., perchloro ethylene or xylene at a rate of 1,000 ml per 50 g of the flux. The flux thus prepared to a suspension was sprayed onto brazing portions of aluminium component parts, and dried at 200° C. The parts were subjected to a brazing operation in a furnace of $N_2$ atmosphere, oxygen content of which was less than 10 ppm, and dew point of which was less than −50° C. They were kept in the furnace for about 4 minutes at 600°–610° C., cooled down to less than 400° C. in the furnace and then drawn out from the furnace to the air. The brazing produced fillets which were sufficient enough to assure strong joints. Flux residues in small amounts were removed easily by washing them in warm water of about 70° C.

EXAMPLE 2

The eutectic powders, same as Example 1, were added to a water-insoluble fluoride, $CaF_2$, present in the amount of 100 weight %. They were added to water at a ratio of 1,000 ml per 50 g to obtain a flux suspension. The suspension was sprayed onto aluminium alloy parts in a way exactly the same as Example 1, and dried at 300° C. The parts were subjected to a brazing operation, similarly to Example 1. Reliable joints were obtained, and flux residues on and about the joints were easily removed by washing them in warm water of 70° C.

EXAMPLE 3

In experiments conducted at the conditions of Example 1 or 2 and with the addition of other fluorides to the eutectics, brazing efficiencies were compared to each other with respect to joints obtained and easiness of the removal of flux residues, were ranked as follows:

Excellent:
  $ZnF_2$, $CaF_2$, $MgF_2$, $AlF_2$, LiF
Better:
  NaF, $NiF_2$, $BaF_2$
Good:
  $CrF_2$, $MnF_2$, CuF, KF Though the employment of NaF or $BaF_2$ or combinations thereof are less effective than eutectics containing $ZnF_2$, $CaF_2$, $MgF_2$, $AlF_2$ and LiF the former (NaF or $BaF_2$) are preferable when the brazing operation should not, because of the circumstances, exhibit any deliquescence. Not only are the fluxes made with the former fluorides completely free from deliquescence, but they also result in melting points which are lower than 561° C., as compared for example to the temperature range of 561°–580° C. for the melting points exhibited by almost all modern brazing materials or filler metals.

I claim:

1. Method of brazing aluminum or aluminum alloy parts, which comprises applying onto portions of the parts to be joined a non-deliquescent flux having a melting point ranging from 540° C. to below 561° C., and being made from a eutectic of 55–47 weight % of $BaCl_2$, 18–22 weight % of NaCl, and 27–33 weight % of KCl, to which is added 1–10 weight % of NaF or $BaF_2$ or combinations thereof, and heating the parts to a temperature higher than 540° C. in the presence of brazing materials which melt in the range of 561° C.–580° C., whereby first the flux and then the brazing materials at said portions of the parts melt and make joints in conjunction with the flux.

2. Method of brazing as claimed in claim 1, in which the flux is applied to said portions after mixing it with solvent which does not contain water.

3. Method of brazing as claimed in claim 1, in which the fluorides in the flux are water-insoluble, and the flux is applied to said portions after mixing it with water.

4. Method of brazing as claimed in claim 1, 2, or 3, in which the method is carried out under an atmosphere having a low oxygen content and a low dew point.

* * * * *